R. KITSON.
BEATERS FOR COTTON-OPENERS.
No. 170,675. Patented Dec. 7, 1875.

Witnesses.
George S. Fulman
Godfrey Morrell

Inventor.
Richard Kitson,
By Rice & Pratt,
Attys.

2 Sheets—Sheet 2.

R. KITSON.
BEATERS FOR COTTON-OPENERS.

No. 170,675. Patented Dec. 7, 1875.

Witnesses.
George S. Tubman
Godfrey Morse

Inventor:
Richard Kitson,
By Kice & Pratt,
Attys.

UNITED STATES PATENT OFFICE.

RICHARD KITSON, OF LOWELL, MASSACHUSETTS, ASSIGNOR TO KITSON MACHINE COMPANY.

IMPROVEMENT IN BEATERS FOR COTTON-OPENERS.

Specification forming part of Letters Patent No. 170,675, dated December 7, 1875; application filed June 21, 1875.

*To all whom it may concern:*

Be it known that I, RICHARD KITSON, of Lowell, in the State of Massachusetts, have invented Improvements in Machines for Opening and Preparing Cotton, of which the following is a specification:

My invention relates to the beater used in machines for opening and beating or preparing cotton or other fibrous substances; and consists in the wire arm B, in combination with the shaft and blades of a cotton-beater, and also in the means by which the arm B is securely attached to the shaft and the blades, substantially as explained in the following description.

Figures 1, 2, 3:
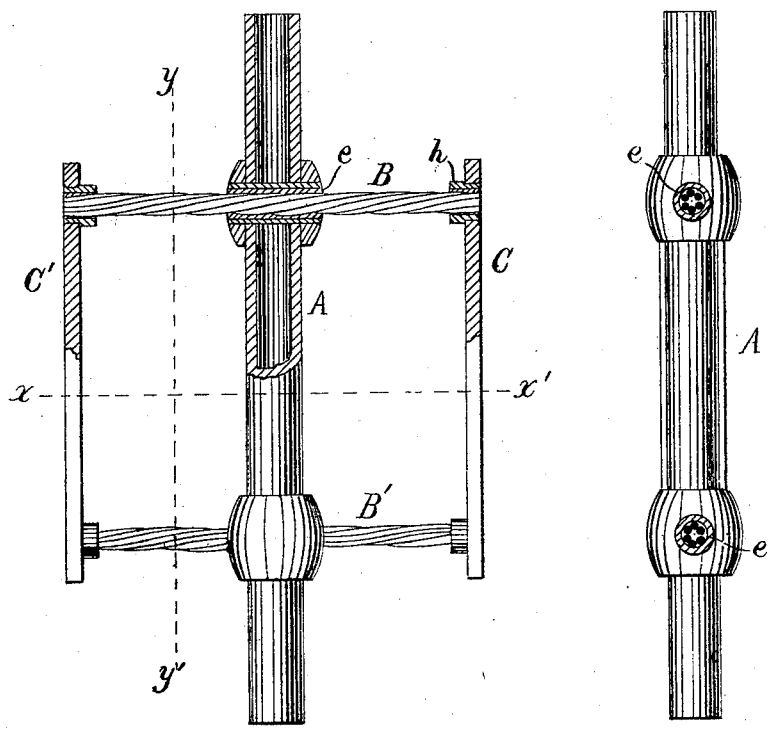
Figure 4:
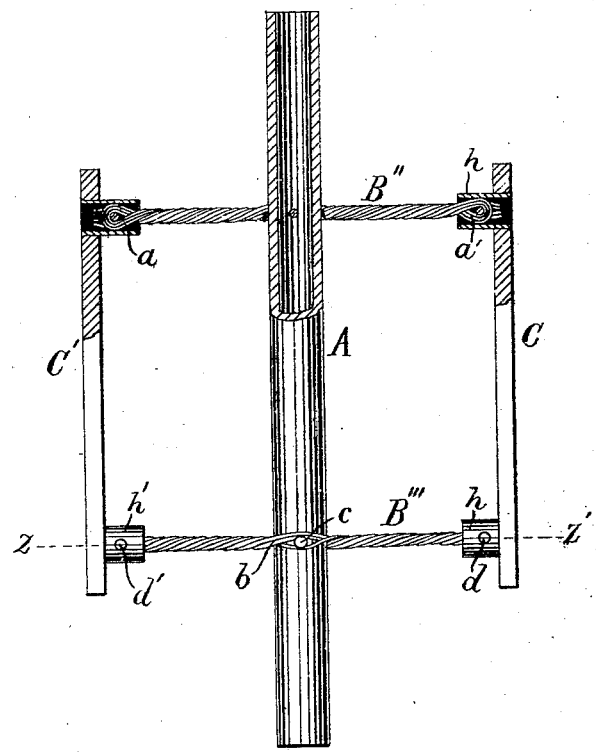
Figure 5:
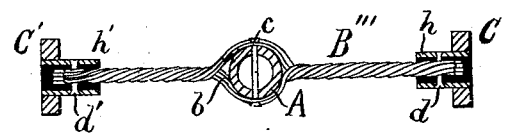

In the drawings, Figures 1 and 4 are plan views of my improved beater, with part of the upper half nearly removed, in a section through the center of the shaft and arms at their intersection, showing the manner in which the shaft, arm, and blade are secured together. Fig. 2 is a section of Fig. 1 through the line $y\ y'$. Fig. 3 is a section of Fig. 1 through the line $x\ x'$. Fig. 5 is a section of Fig. 4 through the line $z\ z'$.

A is the shaft of the beater, adapted to revolve in suitable boxes at the ends and be propelled by the usual machinery in such machines, and in the usual way, and which may be provided, as shown in Figs. 1 and 2, with perforations to receive the arms B B', and with close boxes or thimbles $e\ e$, for strengthening the shaft and bracing the arms, or simply with small perforations for pins $c\ c$ when they are put around the shaft, as shown in Fig. 4. B B' B'' B''' are double arms, constructed of several strands of tempered steel, or other elastic and resilient metal, twisted together and formed in such a manner as to contain the loops $a\ a'$ at the extremities, and also, when they pass around the shaft, with the loop $b$ at the middle, to enable them to be attached securely to the shaft and blades, as hereinafter described. These arms are shown in Fig. 1 as passing directly through the perforations in the shaft A, and so held in boxes $e\ e$, having the interstices filled with Babbitt or other metal, and the whole may be fastened, further, by a pin passing transversely through the shaft and the arms at the center of their intersection. The arms B'' B''' are also shown in Figs. 4 and 5 as attached to the shaft in a manner which I prefer, as at once simpler and more secure, having the strands of the arm B''' divided at the proper point, forming the loop $b$, tightly inclosing the shaft A, so that half the strands pass around on one side and half on the other, and also having the pin $c$ inserted through each segment of the loop $b$ and the shaft A, and thus completely preventing the arm B''' from turning on the shaft. By this construction the center of the beater is made much lighter than in any other way, and the saved weight may be carried to the blades, so as to increase the effectiveness and save power. The blades C C' are provided with the thimbles or lugs $h\ h'$, which may be either inserted in the blade or formed in solid piece thereon, through which are large perforations to receive the extremities of the arms, and small perforations to receive the pins $d\ d'$, as shown in Figs. 4 and 5. Into the lugs $h\ h'$ are inserted the extremities of the arm B''', having the loops $a\ a'$ within the lugs. The interstices are then filled with Babbitt or other metal, and the pins $d\ d'$ are inserted in the small perforations in the lugs $h\ h'$, and through the loops $a\ a'$, the whole forming a perfectly firm and secure juncture of the arm and blade.

I am aware that beater-arms have heretofore been constructed of a solid piece of steel, tempered so as to form a yielding spring; but the difficulty of this method is, that the solid spring-arm, made of proper size, is very difficult or almost impossible to temper, so as to give it the requisite elasticity and preserve its tenacity so that it will not break when in operation, and destroy the machine and endanger the lives of the operators, and the solid spring beater-arm is of necessity comparatively heavier toward and about the shaft than the arm of twisted wires. It is evident, however, that the twisted steel-wire arms I have shown can be easily and cheaply tempered to a proper elasticity without sensibly impairing their strength, as each wire of the strand is small enough to take its temper uniformly throughout.

By my method of construction, it will be seen that a practical elastic arm is made; that great elasticity is obtained, with great strength, tenacity, and firmness of arm; that the shaft and arms are much lighter in proportionate weight, while the blade can be, and is, correspondingly heavier, so as to do more work with less power. Hence, the efficiency and safety of the beater are insured, while the difficulties heretofore existing are completely overcome.

What I claim as new and my invention is—

1. The yielding beater-arm, constructed of two or more strands of tempered steel wire or other flexible metal, in combination with the shaft and blades of the beater, substantially as described.

2. The double beater-arm, provided with loops $a$ $a'$ at the extremities for securing them to the blade, substantially as described.

3. The combination of the beater-blade C and the lug $h$ with the beater-arm, provided with the loop $a'$, substantially as described.

4. The combination, with the beater-shaft A, of the twisted-wire beater-arm, whose strands are divided and encompass the shaft, substantially as described.

RICHARD KITSON.

Witnesses:
A. G. CUMNOCK,
SAML. E. STOTT.